(No Model.)

W. BEERS.
ATTACHMENT FOR LATHES FOR TURNING CRANK AXLES.

No. 342,895. Patented June 1, 1886.

Witnesses:
E. C. Perkins.
C. E. Ruggles.

Inventor:
Wheeler Beers
By H. M. Wooster
Atty.

UNITED STATES PATENT OFFICE.

WHEELER BEERS, OF BRIDGEPORT, CONNECTICUT.

ATTACHMENT FOR LATHES FOR TURNING CRANK-AXLES.

SPECIFICATION forming part of Letters Patent No. 342,895, dated June 1, 1886.

Application filed March 17, 1886. Serial No. 195,555. (No model.)

*To all whom it may concern:*

Be it known that I, WHEELER BEERS, a citizen of the United States, residing at Bridgeport, in the county of Fairfield and State of Connecticut, have invented certain new and useful Improvements in Lathe Attachments for Turning Crank-Axles; and I do hereby declare the following to be a full, clear, and exact description of the invention, such as will enable others skilled in the art to which it appertains to make and use the same.

Heretofore it has been a matter of great difficulty to turn crank-axles in ordinary lathes, for the reason that special devices were required to hold them in place, and as the sizes, shapes, and lengths of wagon-axles vary greatly it has been necessary that dogs or other holding devices be specially made for each size and style of axle, or else that the end of the body of the axle be heated and bent around in line with the arm in order to center both ends. Both ways of doing it are both inconvenient and expensive, and, moreover, necessitate great loss of time in adjusting the axles. In order to wholly overcome these objections, and to provide a device that may be readily attached to any ordinary lathe and may be almost instantly adjusted to hold any size or style of crank-axle, I have devised the novel attachment of which the following description, in connection with the accompanying drawings, is a specification, numbers being used to indicate the several parts of the device.

Figure 1:
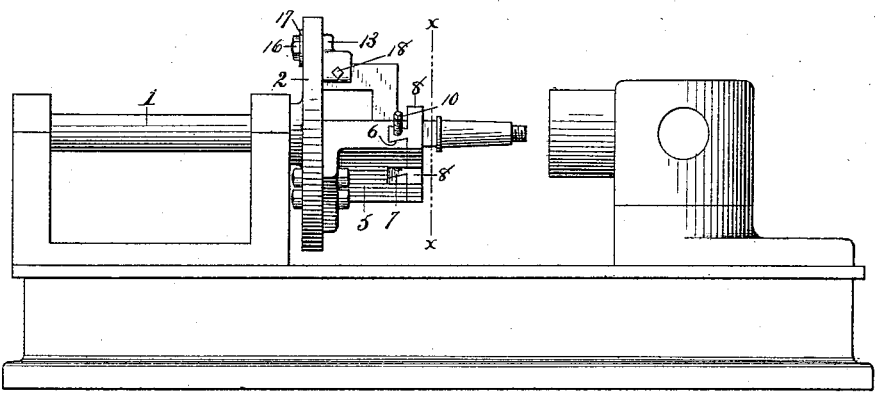
Figure 2:
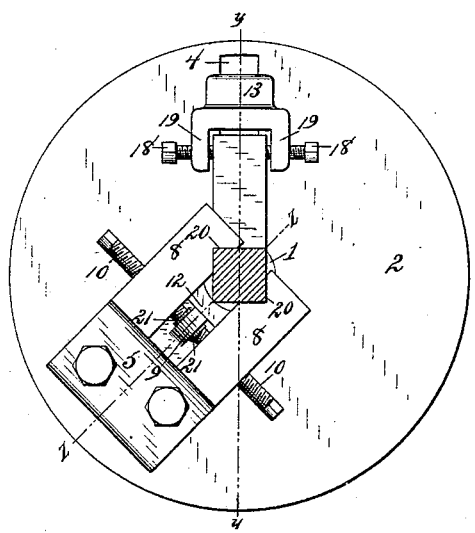
Figure 3:
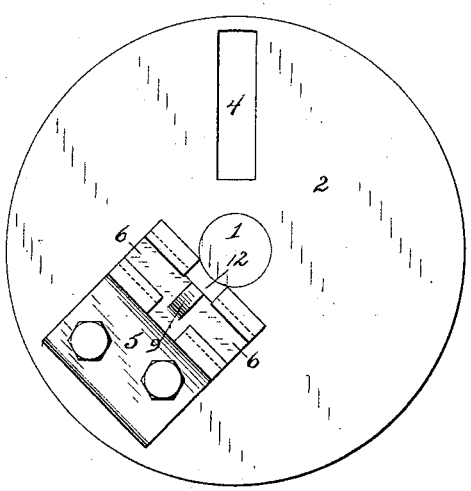
Figure 4:
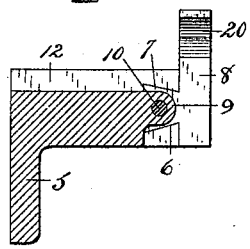
Figure 5:
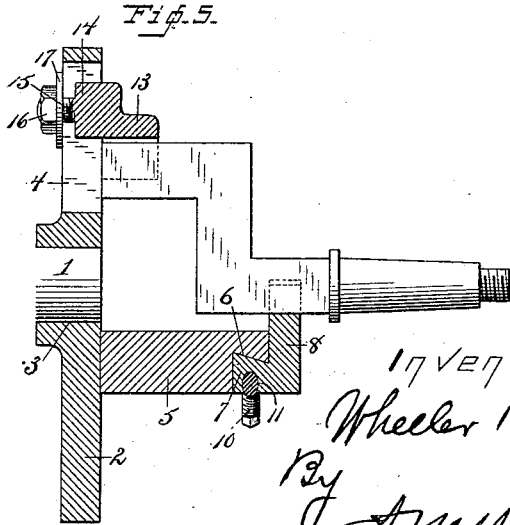

Figure 1 is an elevation of so much of a lathe as is necessary to illustrate the manner in which my novel attachment is applied. It may be used upon any size or style of lathe, but is especially adapted for use in connection with the turret-head lathe described and claimed in my Letters Patent No. 267,480, dated November 14, 1882. Fig. 2 is an enlarged view of the face-plate with my attachment in operative position, the axle being in section on the line $x$ $x$ in Fig. 1; Fig. 3, a front view of the face-plate with the jaws and the steadying-clamp removed; Fig. 4, a central longitudinal section of the bracket on the line $z$ $z$ in Fig. 2, one of the jaws being shown in elevation; and Fig. 5 is a section of the face-plate, bracket, and clamp on the line $y$ $y$ in Fig. 2, looking toward the right, the axle being shown in elevation.

As the construction of the lathe itself is not of the essence of my invention, I shall not enter into any description thereof.

1 is the shaft or spindle, and 2 the face-plate, made integral therewith or secured thereto. This face-plate may be of any preferred form, although I preferably use a disk, as shown in the drawings. The face-plate is provided with the usual central aperture, 3, and is ordinarily provided with a slot, 4, the purpose of which will presently be explained.

5 indicates a bracket, which may be made integral with or bolted to the face-plate. At the outer end of the bracket is a dovetailed groove, 6, which is adapted to receive correspondingly-shaped tongues 7 on the jaws 8.

9 is a boss at the end of the bracket, which supports a rod, 10, provided with right and left screw-threads. The jaws are provided, respectively, with right and left threaded apertures 11, which are engaged by the threads upon the rod. The bracket is made heavy, so that the jaws will be firmly supported, and will thus be able to hold heavy pieces of work. In practice a groove or channel, 12, is provided in the top of the bracket to afford ample room for large-sized axles.

13 is a steadying-clamp, which I have shown as having a tongue, 14, which enters slot 4 in the face-plate. A threaded stud, 15, projects through this slot, and is provided with a nut, 16, and a washer, 17, which permits the steadying-clamp to be readily adjusted in the slot. Set-screws 18 pass through arms 19, which project from the steadying-clamp and engage the body of the axle to hold it in any desired position, as is clearly shown in Fig. 2. This steadying-clamp is a valuable though not indispensible feature of my invention, and in use may be attached to the bracket, although preferably I attach it to the face-plate, as shown.

The operation is as follows: The shank of the axle is placed between the jaws, which are preferably provided with notches 20 to receive it. The jaws are tightened up by turning threaded rod 10 in the proper direction, collars 21 or any similar device being provided on said rod to hold it against endwise motion. As is clearly apparent in Fig. 2, the construction of the parts is such that when grasped by the jaws the axle is necessarily accurately centered, no matter whether the axle is large or small. Having clamped the shank of the axle firmly in position, the body thereof is steadied by adjusting clamp 13, and tightening set-screws 18 against it, it being of course understood that the axle is placed in the jaws in such a position that the body thereof will rest between the arms of the steadying-clamp. Having finished all the operations that it is desired to perform upon the arm of the axle, it may be readily removed by loosening set-screws 18 and opening the jaws, which is accomplished by rotating threaded rod 10 in the opposite direction.

I do not of course desire to limit myself to the exact details of construction shown and described, as it is obvious that they may be varied within reasonable limits without departing from the spirit of my invention.

I claim—

1. The combination, with the face-plate of a lathe, of a bracket attached to or made integral therewith, and provided with a groove, 12, to receive an axle, and jaws adapted to slide at the outer end of said bracket, and provided with notches 20, whereby the shank of an axle may be firmly grasped and accurately centered.

2. The face-plate having a bracket with a groove at its outer end, and a channel, 12, in combination with jaws having tongues adapted to slide in said grooves, and means—for example, a right and left threaded rod—which engages the jaws, and is held against endwise motion, substantially as described.

3. The face-plate having a bracket provided with a dovetailed groove and boss, 9, in combination with jaws having notched faces, and adapted to slide in said groove, and means—for example, a right and left threaded rod—adapted to engage said jaws, and collars which hold the threaded rod against endwise motion, whereby an axle may be grasped and accurately centered.

4. In a lathe attachment for turning crank-axles, the combination, with the face-plate, of a bracket having sliding jaws, which grasp and accurately center the shank of the axle, and a steadying-clamp adapted to support the body of the axle.

5. The face-plate and bracket having sliding notched jaws, in combination with an adjustable clamp having arms provided with set-screws which bear against the body of the axle, as and for the purpose set forth.

6. The combination, with the face-plate having a slot, 4, and a bracket having sliding jaws, of a steadying-clamp adapted to be adjusted in said groove, and provided with set-screws which bear against the body of the axle to steady it.

In testimony whereof I affix my signature in presence of two witnesses.

WHEELER BEERS.

Witnesses:
 A. M. WOOSTER,
 C. E. RUGGLES.